(No Model.)
P. DARCHE.
RECOIL OPERATED FIREARM.
No. 519,151.
Patented May 1, 1894.
7 Sheets—Sheet 4.
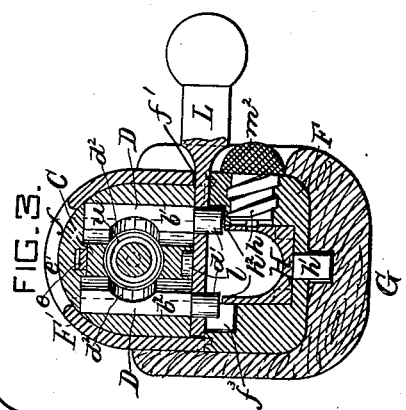
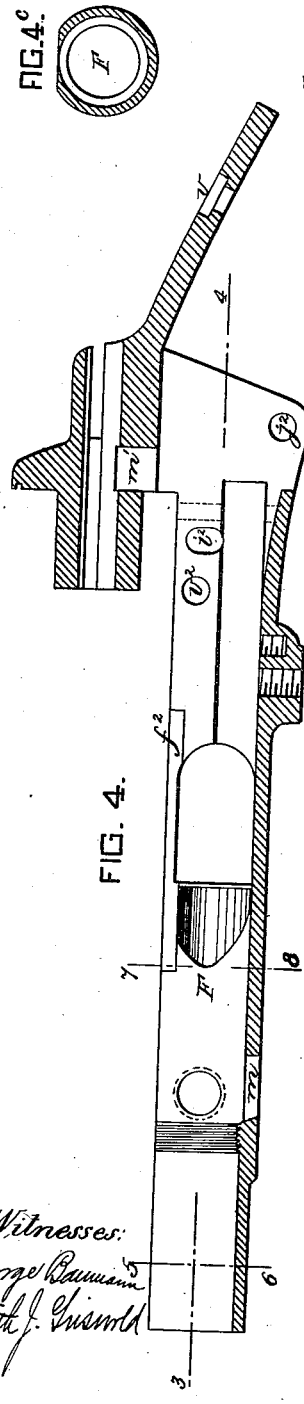
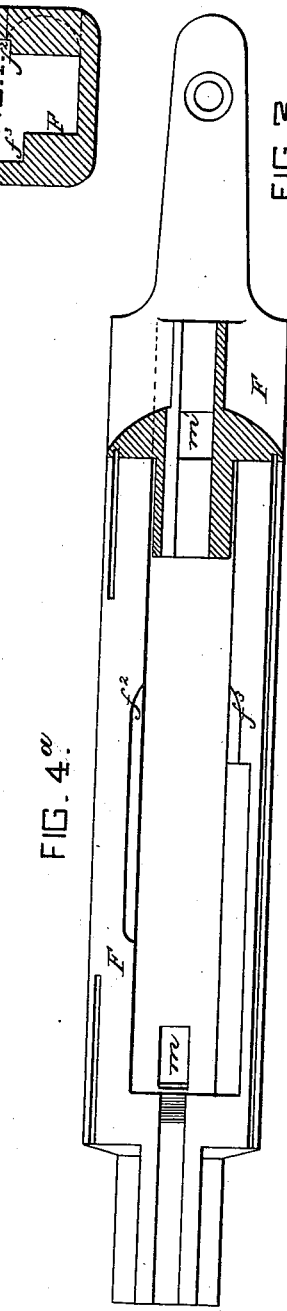
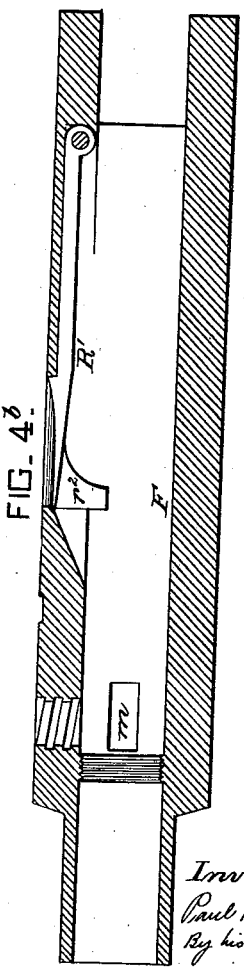
Witnesses:
Inventor
Paul Darche
By his Attorney (No Model.) 7 Sheets—Sheet 5.
P. DARCHE.
RECOIL OPERATED FIREARM.
No. 519,151. Patented May 1, 1894.
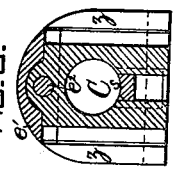
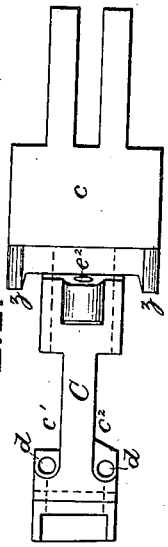
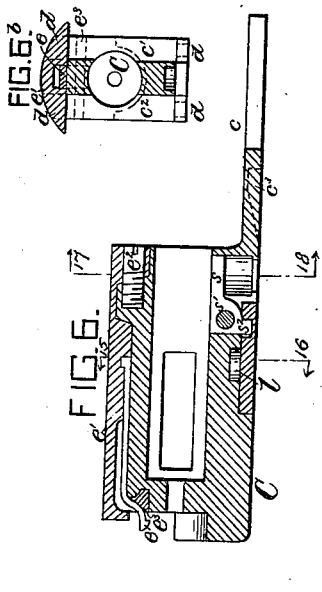
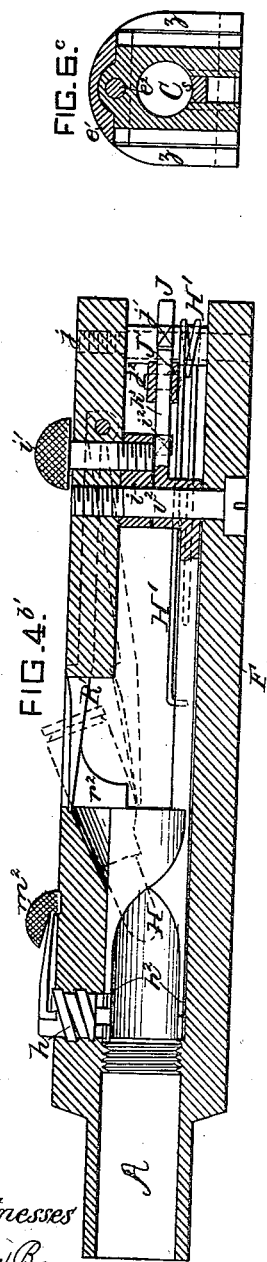
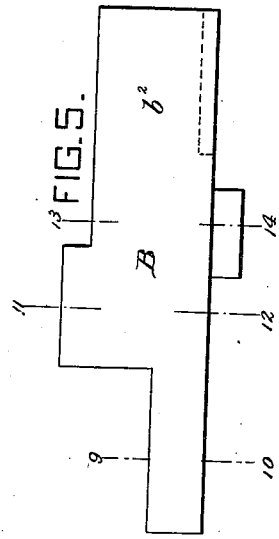
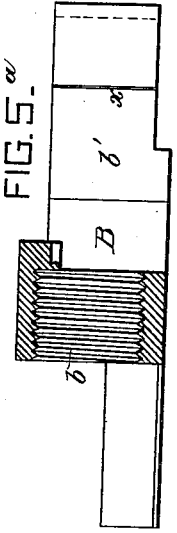
Witnesses
George Baumann
Edith J. Griswold
Inventor
Paul Darche
By his Attorneys
Howson and Howson (No Model.) 7 Sheets—Sheet 6.
P. DARCHE.
RECOIL OPERATED FIREARM.
No. 519,151. Patented May 1, 1894.
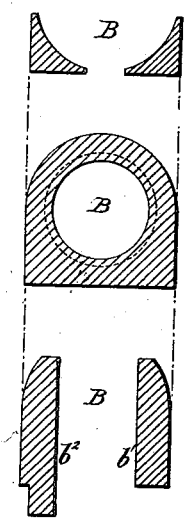
FIG 5.
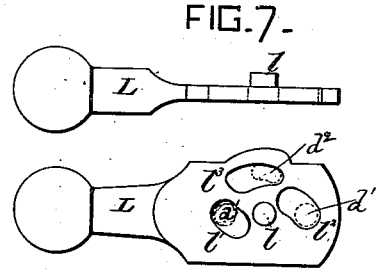
FIG. 7.
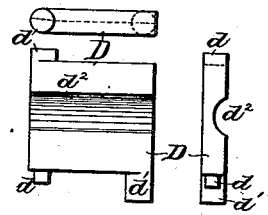
FIG. 8.
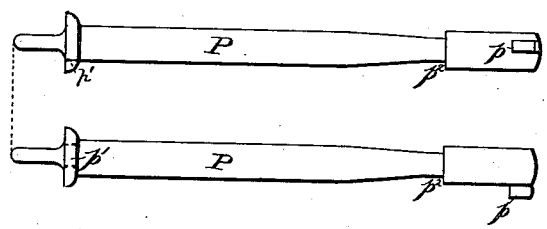
FIG. 9.
FIG. 13.
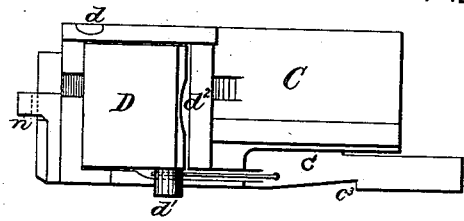
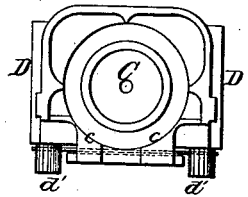
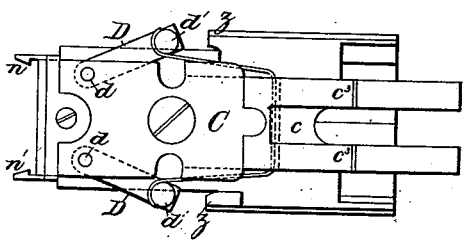
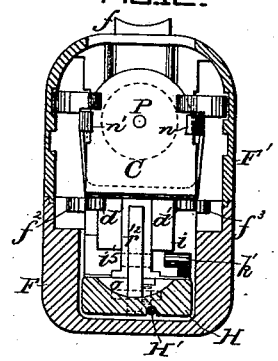
FIG. 12.
WITNESSES:
George Baumann
Edith J. Griswold
INVENTOR
Paul Darche
BY
Howson and Howson
his ATTORNEYS (No Model.)  P. DARCHE.  7 Sheets—Sheet 7.
RECOIL OPERATED FIREARM.
No. 519,151.  Patented May 1, 1894.
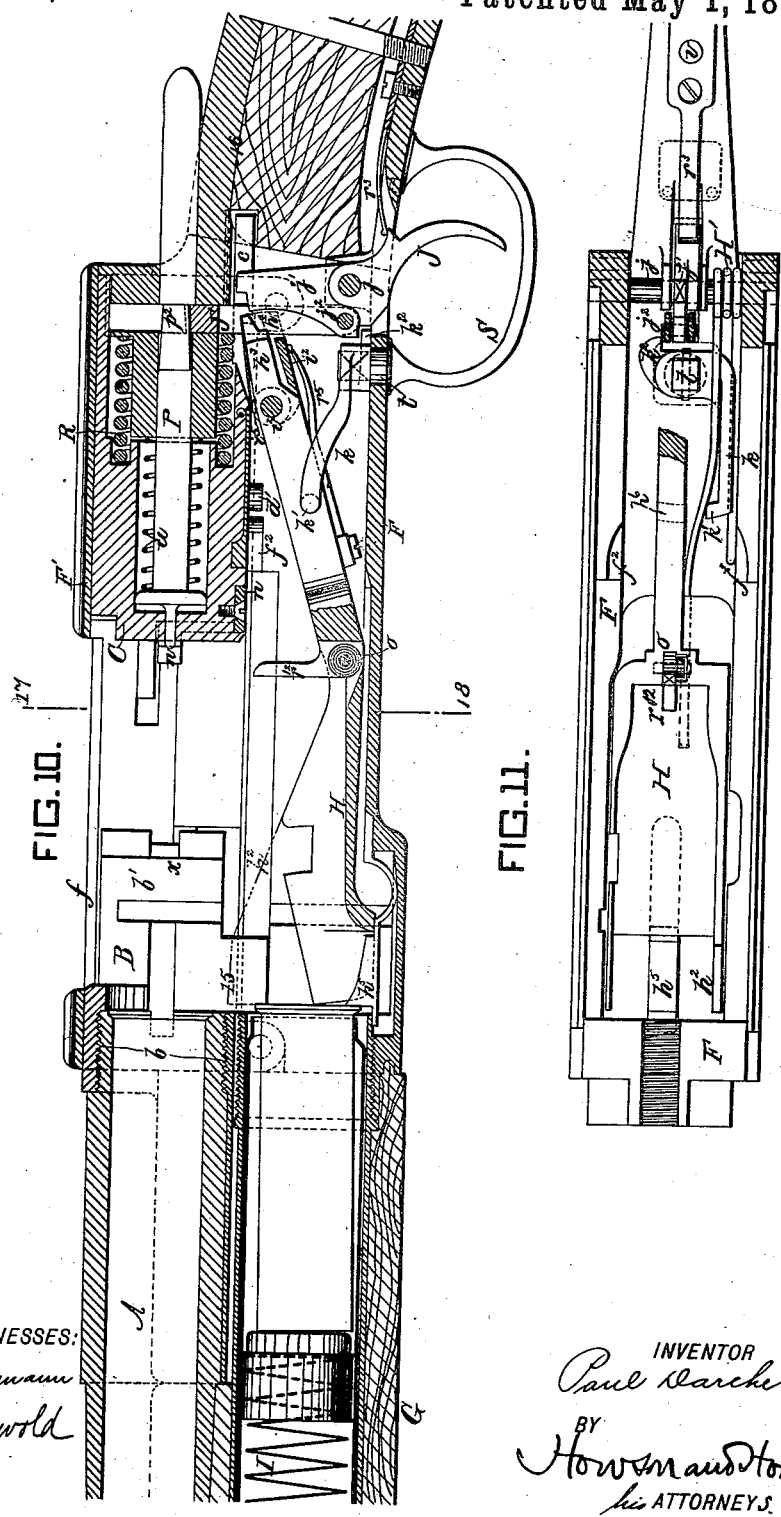
WITNESSES:
George Baumann
Edith J. Griswold
INVENTOR
Paul Darche
BY
Howson and Howson
his ATTORNEYS.

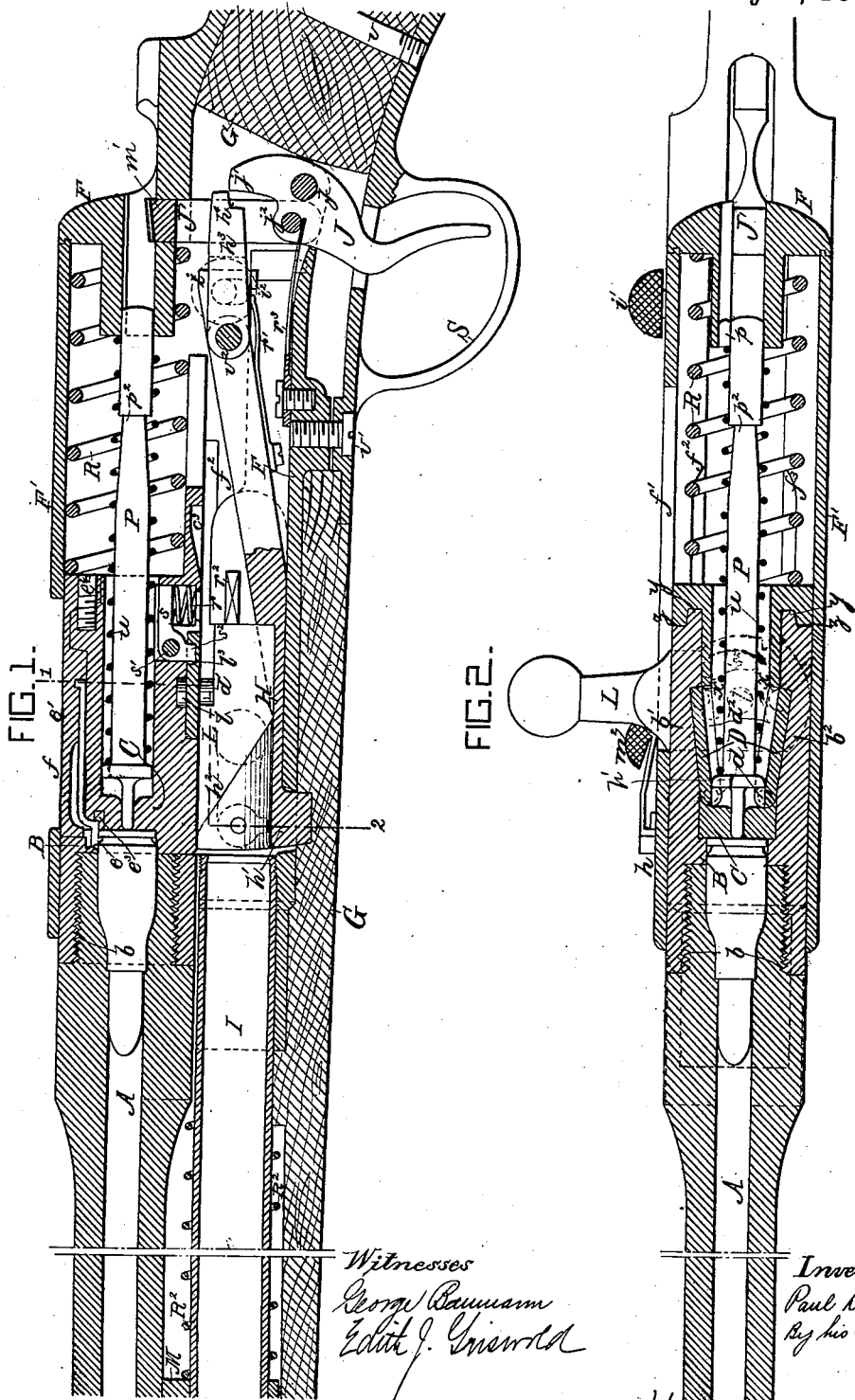

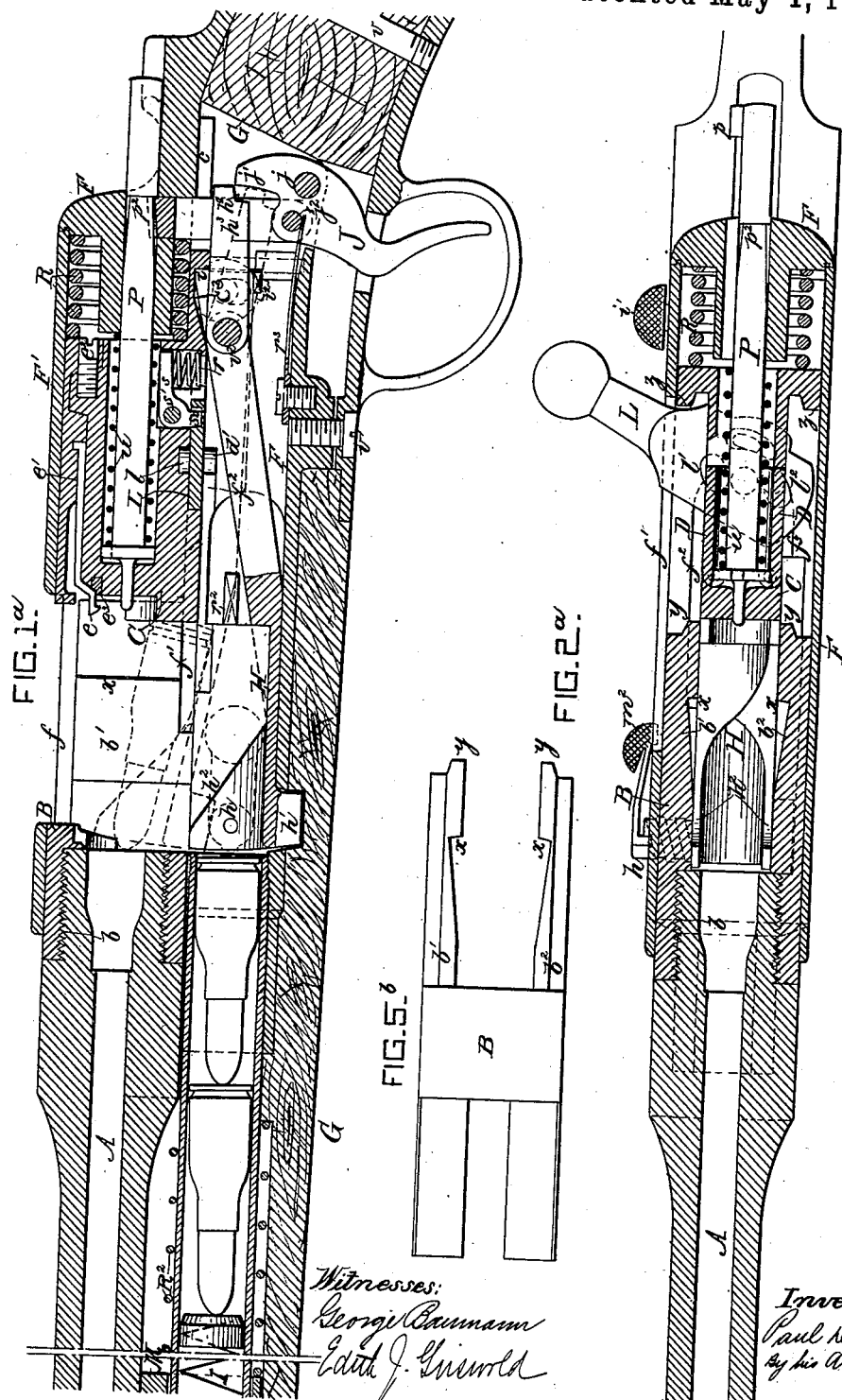

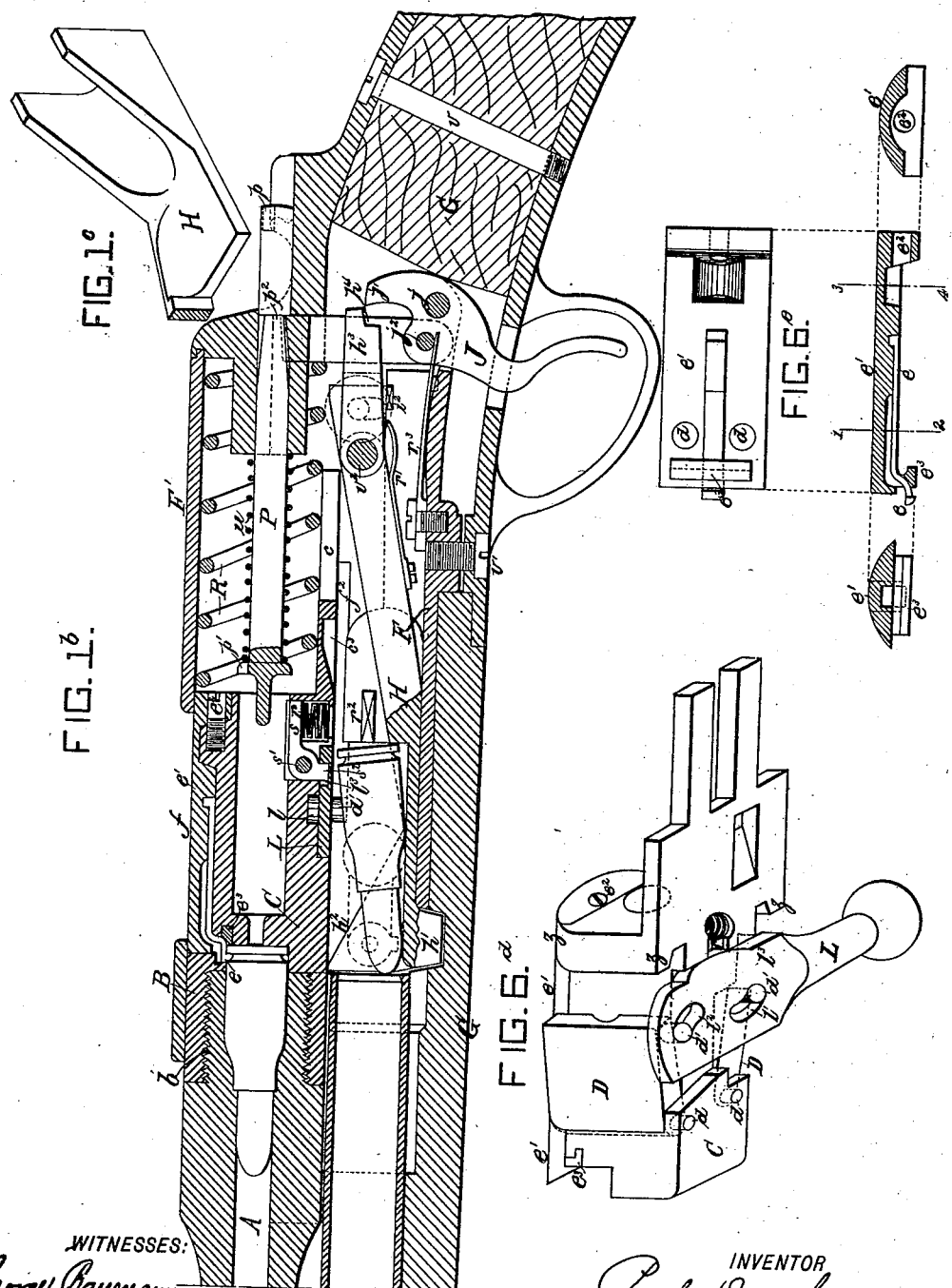

UNITED STATES PATENT OFFICE.

PAUL DARCHE, OF PARIS, FRANCE.

RECOIL-OPERATED FIREARM.

SPECIFICATION forming part of Letters Patent No. 519,151, dated May 1, 1894.

Application filed August 1, 1893. Serial No. 482,079. (No model.) Patented in France December 5, 1892, No. 226,162.

*To all whom it may concern:*

Be it known that I, PAUL DARCHE, engineer, a citizen of the Republic of France, residing in Paris, France, have invented certain Improvements in Automatic Repeating Fire-arms, (for which I have obtained a French patent, dated December 5, 1892, No. 226,162,) of which the following is a specification.

The fire-arm forming the object of the present invention is provided with an automatic repeating action and enables the force of the recoil to be utilized for working the breech mechanism, as hereinafter explained, being also provided with means for suspending the repeating action and enabling the arm to be loaded by hand if required.

The cartridge elevator or device employed for elevating or pushing up the cartridges from the magazine into the chamber automatically can be thrown out of action by means of a stop when the loading is to be performed by hand. This elevator is connected with stops acting on the movable breech block and on the trigger so that the action is locked automatically by the action of the elevator until the breech chamber is completely closed. A safety stop also blocks the movement of the striker in case the closing of the breech is imperfectly performed. When the repeating action is used the barrel and the part of the breech attached thereto together with the movable breech block simultaneously move longitudinally backward relatively to the stock under the impulse resulting from the recoil and are thereby caused to compress springs which deaden the shock of the recoil upon the shoulder and at the same time store up power sufficient to actuate the breech mechanism for firing the next shot. The barrel and the breech chamber return to their original position before the return of the movable breech block takes place so as to leave the breech open long enough for the ejection of the empty cartridge shell and the introduction of a fresh cartridge after which the movable breech block is automatically released and caused to close the breech. When the fire arm is not used as a repeater the same opening is formed but the return of the movable breech block to close the breech is effected by unlocking by hand a stop or catch by acting upon a thumb piece or projection which like the projection connected with the cartridge elevator is situated on the right hand side of the firearm.

In order that the invention may be fully understood I shall now proceed more particularly to describe the same and for that purpose shall refer to the several figures on the annexed sheets of drawings, the same letters of reference indicating corresponding parts in all the figures.

Figure 1 of the accompanying drawings represents in vertical longitudinal section an automatic repeating rifle constructed according to this invention, the parts being represented in the position which they occupy when the breech is closed. Fig. 2 is a corresponding view in horizontal section the section being taken in the plane of the axis of the barrel. Figs. 1$^a$ and 2$^a$ are similar views to Figs. 1 and 2, but represent the parts in the positions which they occupy when the breech is open. Fig. 1$^b$ is a view similar to Fig. 1 showing the breech closed and the firing bolt in its cocked position. Fig. 1$^c$ is a perspective view of the forward end of the elevator. Fig. 3 illustrates the breech mechanism in transverse section, the section being taken on the line 1—2, Fig. 1. Figs. 4 and 4$^a$ illustrate in vertical and horizontal section respectively the receiver containing the breech mechanism, the section being taken through the axis of the barrel. Fig. 4$^1$ represents the said receiver in horizontal sec tion taken on the line 3—4, Fig. 4, and Fig 4$^{b'}$ represents a section taken through th$\epsilon$ axis of the cartridge elevator. Figs. 4$^c$ an $\epsilon$ 4$^d$ represent the receiver in transverse sectio1 on the lines 5—6, and 7—8, Fig. 4, respect ively. Figs. 5, 5$^a$ and 5$^b$ represent a part o the breech attached to and sliding longitudi nally with the barrel of the rifle, in side ele vation (viewed from the left hand) in vertica longitudinal section and in plan respectivel$\jmath$ Fig. 5$^c$ consists of three views of the sai part of the breech in sections taken on th lines 9—10, 11—12 and 13—14, Fig. 5, r$\epsilon$ spectively. Figs. 6 and 6$^a$ represent the mo$\nu$ able breech block in vertical longitudinal se tion and in plan respectively. Figs. 6$^b$ an 6$^c$ represent this breech block in transver$\epsilon$ sections taken on the lines 15—16 (looking t ward the left-hand of), and 17—18 (lookir toward the right-hand or Fig. 6, respectively. Fig. 6ᵈ is a perspective view of the movable breech block and hand lever showing the under side. Fig. 6ᵉ shows a bottom plan, a longitudinal section and two cross sections of the ejector apart. Fig. 7 consists of two views illustrating in elevation and in plan the hand lever for working the movable breech block. Fig. 8 represents one of the cams or locking levers employed with the movable breech block, in side and end elevation, and in plan. Fig. 9 represents the firing bolt in elevation and in plan. Fig. 10 represents a gun for sporting purposes, or a shot gun in vertical longitudinal section constructed according to this invention the breech being in the open position. Fig. 11 represents the breech mechanism of this gun in horizontal section taken on the lines 15—16, Fig. 10, and Fig. 12 represents the mechanism in transverse section taken on the line 17—18, Fig. 10. Fig. 13 consists of three views representing in side elevation, bottom plan, and end elevation, the movable breech block as arranged for employment in the shot gun.

I will first describe the construction of the rifle as illustrated in Figs. 1 to 9. The barrel represented at A may be of any ordinary or suitable construction and forms no part of the present invention. This barrel is screwed or rigidly connected to a breech piece B (Figs. 1, 2 and 5) at $b$ which breech piece is provided with two side plates or cheeks $b'$ and $b^2$, Figs. 1 and 5ᵇ representing notches $x$ capable of engaging with locking levers D hereinafter described carried by the movable breech block C. These side plates $b'$ $b^2$ are each provided at their extremities with a tongue or projection $y$ engaging with corresponding projections or hooks $z$, Fig. 2, on the movable breech block C. This arrangement enables the movable breech block C to be rigidly retained in position by the locking levers D and prevents the side plates $b'$ $b^2$ from springing outward under the pressure of the said levers. The movable breech block C, Figs. 1, 2, 6, 6ᵃ, 6ᵇ and 6ᵉ closes the breech chamber of the barrel A and is retained in the closed position by means of the two levers D placed in recesses $c'$ $c^2$, Fig. 6ᵃ, in the side of the movable breech block which is perforated with a longitudinal central passage in which works a firing bolt P, and carries the projections or hooks $z$ hereinbefore referred to, engaging with the projections $y$ on the part B forming an extension of the barrel, Fig. 2. This movable breech block is also provided with an extractor $e$, a safety stop $s$ for the firing pin (acting in case the breech is imperfectly closed) and a hand lever L. The tail $c$ of the movable breech block is provided with a shouldered notch $c^3$ on its under surface, Figs. 1 and 6, acting in connection with the cartridge elevator hereinafter described. The locking levers D, Figs. 2, 6ᵃ and 8, oscillate upon their axes $d$ in the movable breech block and are provided at their lower rear part with a small cylindrical extension or projection $d'$ by means of which they are automatically released at the end of the recoil movement and disengaged from the notches $x$ in the plates $b'$ $b^2$ by the action of two inclined planes $f^2$ and $f^3$ in the receiver Fig. 4ᵃ. These levers are recessed at $d^2$, Fig. 8, for the passage of the head of the firing bolt P. The extractor $e$ is retained in the upper part of the movable breech block by means of a plate $e'$, Figs. 6 and 6ᵉ secured at one end by a screw $e^2$ and at the other end by a projecting part $e^3$ of the plate $e'$, which part $e^3$ is perforated for the passage and play of the extractor $e$. The plate $e'$ also forms a bearing for the levers D and when removed the latter can be placed in position. The hand lever L, Figs. 1, 2 and 7, is employed for opening the breech for the purpose of loading by hand or for removing any cartridge that has not been discharged. In drawing back this lever the breech being closed the lever is caused to rock upon its axis or pin $l$ situated under the movable breech block, Figs. 1, 2, 3, 6 and 7, and two inclined slots $l'$ $l^2$ provided in the lever as represented in Figs. 6ᵃ and 7, and engaging with the projections $d'$ on the locking levers D cause the latter to move inward and escape from the notches $x$ in the plates $b'$ $b^2$ attached to the barrel. Under these conditions the movable breech block C is enabled to be moved away from the breech chamber by means of the lever L until the stop $i$, Figs. 1 and 1ᵃ, engages with the notch $c^3$ in the tail plate $c$, the firing bolt P being drawn back and cocked at the same time by a notch $p^2$ on the said bolt engaging with a sear J'. When the elevator H is locked or put out of action as hereinafter explained, the breech remains open as indicated in Figs. 1ᵃ and 2ᵃ and a cartridge is enabled to be introduced by hand into the breech which can then be closed by pressing down the thumb piece or projection $i'$ so as to disengage the bolt or catch $i$, Fig. 1ᵃ from the notch in the movable breech block.

The firing bolt P, Figs. 1, 2 and 9, also serves to eject the empty cartridge shells. Its movement is about three-sixteenths of an inch longer than is necessary for striking. In case it is desired to remove a cartridge from the barrel after the firing bolt P has been cocked, it is necessary to first turn the firing bolt half way round, which places it in the safety position (just opposite to that shown in Figs. 1ᵇ, 2 and 2ᵃ), by reason of a projection $p$ at the rear end of the firing bolt which will strike the rear end of the receiver F and prevent its further movement. The turning of the firing bolt a half revolution, as described, also places the notch $p'$ (Fig. 9) in line with the safety catch $s$, which is necessary in order to open the breech after the firing bolt has been cocked. In this safety position the notch $p'$ in the head allows the safety catch $s$ carried by the movable breech block C to pass. In any other position the firing bolt P cannot pass the safety stop $s$ unless the latter is depressed by the complete closing of the breech. The striker is also provided with a notch $p^2$ enabling it to engage with the nose of the sear J' as represented in Fig. 1ª. The safety catch s hereinbefore referred to vibrates upon a horizontal axis s', Figs. 1 and 6, and is acted on by a spring r which causes it to tend to rise and stop the forward movement of the firing pin P except when the breech is properly closed and the safety catch is lowered by placing the hand lever L in the normal position. This catch s is connected to the said lever L by a projection $s^2$ which engages with an eccentric slot $l^3$, Figs. 7 and $6^d$ formed in the said lever. The movable breech block is subjected to the action of a spring R having a bearing in the rear end of the receiver F. The said receiver, Figs. 1, 2 and 4, supports the lower parts of the mechanism (elevator, magazine, trigger guard, trigger and sear), and moreover sustains the excess of the force of the recoil which is not absorbed by the springs, the said receiver being attached to the stock G of the rifle and insures the rigidity of all the parts. The top of the receiver is closed by a cover F' protecting the parts of the breech and acting as a guide for the barrel and movable breech block when sliding longitudinally backward under the action of the recoil and of the working of the breech mechanism. The cover F' is provided with an opening f, Figs. 1 and 3, for the introduction and ejection of the cartridges and with a lateral slot or opening f', Figs. 2 and 2ª for the play of the hand lever L. The receiver is connected to the stock G by a screw v passing through the tang of the receiver and by a screw v' which likewise serves to secure the trigger guard plate carrying the trigger guard S. The receiver is further provided with inclines $f^2 f^3$ hereinbefore referred to, a stop for the elevator, the thumb piece or projection i' for working the stop i which engages with the movable breech block, an aperture for the introduction of the cartridges provided with a door closed by a spring R', an opening m, Figs. 4, 4ª and $4^h$ for the projection h' on the elevator H and another aperture m' for the nose of the sear J'. At its front extremity it is provided with a screw thread engaging with the magazine I. This magazine is in the form of a tube, Fig. 1, and contains a number of cartridges which are introduced through the aforesaid orifice in the side of the receiver and compress a suitable spring by which they are subsequently pushed out onto the elevator H as hereinafter described. It also carries a coiled spring $R^2$ and a ring M serving to move the barrel forward after the recoil. The ring M compresses the spring $R^2$ during the recoil and slides upon the magazine being rigidly fixed by a dovetail in the under side of the barrel A.

The cartridge elevator H of simple shape is arranged in the receiver in a line with the magazine being hinged upon a pin $v^2$ and acted on by a spring H' which tends to elevate it the said spring being arranged on the rat trap principle and coiled upon a pin j forming the axis of the trigger J. The elevator is provided with two inclines $h^2$ acted on by the movable breech block C which slides over them in its forward movement and forces down the elevator into its depressed or normal position. The elevator acts upon the stop i connected to the thumb piece $i^A$ and oscillating upon the pin $v^3$, Figs. 1, 1ª and $4^{b'}$, by the intervention of a bent lever $i^2$ situated under the arm $h^3$ so that as the elevator ascends it lowers the said stop i and frees the movable breech block C. The movable breech block is then at liberty to be acted upon by the spring R precisely at the moment when the elevator H has pushed up a cartridge to the level of the breech chamber. This action whereby the breech is closed automatically and precisely at the proper time without any delay or premature movement is of great importance.

The arm $h^3$ of the elevator H is provided with a notch $h^4$ which engages with the trigger J when the latter is pulled and prevents the elevator from working (even when the breech is open) unless the shooter has allowed the trigger to resume its normal position. This interlocking of the elevator, movable breech block and the trigger constitutes an important part of the invention and regulates the action with great precision by enabling the shooter to load by hand under any conditions with the same precision as in the case of an ordinary breech loading rifle. A spring r' constantly tends to force up the stop i.

The stop h of the elevator H, Figs. 3 and $4^{b'}$, is provided with a quick threaded screw capable of being actuated by a roughened projection or lever $m^2$. By rotating this lever the inner extremity of the stop screw h can be caused to engage with a recess in the elevator so as to lock the latter and suspend the automatic supply of cartridges, but when unscrewed enables the repeating action to be resumed.

The elevator when raised constitutes in itself a stop for the cartridges in the magazine as indicated by the dotted lines in Fig. 1ª by means of a heel or projection $h'$ which projects in front of the magazine.

The spring door R' of the orifice through which the cartridges are introduced is provided with a projection $r^2$ (Figs. 1 and $4^h$) which acts as a stop for the cartridge which has passed from the magazine onto the elevator.

The trigger J, Fig. 1, presents no features of novelty except with regard to the projection j', hereinbefore referred to, which engages with the notch $h^4$ in the lever $h^3$ connected to the elevator H and locks the latter until the trigger is released by the finger. The sear J' is connected to the trigger by a pin $j^2$, and works in an opening m' in the receiver so as to project above the bottom of the latter and engage with the shoulder $p^2$ of the firing bolt P. A spring $r^3$, acting upon the pin $j^2$ by which the sear is connected to the trigger causes the nose of the sear to tend to project into the path of the firing bolt which in order to be cocked by hand requires to overcome the pressure of the spring $r^3$.

The action of this breech mechanism is as follows: When loading by hand, the magazine being filled with cartridges or not, the first operation consists in rendering the elevator H immovable by screwing in the stop $h$ after which the breech is opened by drawing back the movable breech block C by the aid of the hand lever L (Fig. 2$^a$) until it is engaged by the stop $i$ springing into a notch $c^3$ (Fig. 1$^a$). Under the action of the lever L the barrel A moves back with the movable breech block C and toward the end of the movement the locking levers D, coming into contact with the inclines $f^2 f^3$ are forced inward and disengaged from the notches $x$ in the part B of the breech attached to the barrel which together with the latter is then pushed forward by the action of the spring $R^2$. The breech being now open the movable breech block being retained by the stop $i$, a cartridge is introduced into the breech chamber through the opening $f$ in the upper part or cover F' of the receiver F. In case a cartridge has been previously fired off the empty shell drawn out by the extractor $e$ is ejected by the striker which may continue its forward movement for about three-sixteenths of an inch, there being nothing to prevent the shell from turning over. In all instances when a fresh cartridge is introduced the projection $i'$ of the stop $i$ is acted upon by pressing down the thumb piece $i'$ so as to liberate the movable breech block C which, under the influence of the spring R, compressed in the preceding operation, is suddenly forced forward. The levers D are caused to engage with the recesses $x$ in the fixed breech B by the inertia of the hand lever L when the movable breech block comes in contact with the barrel. In fact the lever L which at this moment when the projection $i'$ of the stop $i$ is acted upon is in the retracted position moves forward spontaneously, owing to the shock resulting from the sudden stoppage of the movement of the movable breech block by the barrel. In this movement the inclined slots $l'$, $l^2$ in the lever L force out the levers D and the slot $l^3$ acts upon the tail $s^2$ of the stop or catch $s$ so as to depress the latter and compress the spring $r$. Under these conditions no backward movement is possible, the breech is completely closed, the firing bolt P is free to move and the lever $h^3$ connected with the elevator H presents its notch $h^4$ in front of the arm $j'$ on the trigger J. In case the breech has not been completely closed, owing to an incomplete movement of the locking levers for example, the stop or catch $s$ will not be completely lowered by the lever L and the firing bolt P is consequently locked, thus affording absolute safety to the shooter. The outward movement of the levers D may be assisted by small springs supplementing the action of the lever L. Assuming that the breech is completely closed it is simply necessary to act upon the trigger J in the usual manner in order to lower the nose of the sear J' and liberate the firing bolt P which is immediately driven forward by the action of a main spring $u$ and explodes the cartridge. In order to discharge a fresh cartridge the movements hereinbefore described are simply repeated. These movements may be summed up as follows, viz: first, opening the breech; second, inserting a cartridge into the breech chamber; third, pressing down the projection of the stop $i'$ of the movable breech block, and, fourth, firing.

*Repeating action.*—In this case it must be assumed that the magazine has been filled through the opening provided with a door R' and that one cartridge has been placed in the breech chamber. The elevator H is simply freed by unscrewing the stop $h$ and the firing is commenced. The opening of the breech and ejection of the shell take place in the same way as when loading by hand with the difference that in the present case the force of the recoil or reaction due to the explosion of the cartridge causes the breech to open in place of the force produced by acting upon the lever L. The elevator being free and carrying a cartridge immediately ascends (dotted lines Fig. 1$^a$) when the barrel has returned to its place. When the elevator has ascended sufficiently to place the fresh cartridge on a level with the breech chamber the movable breech block C being released by the movement of the elevator (which acts automatically upon the stop $i$ by the intervention of the arms $h^3$ and projection $i^2$) springs forward and pushes the cartridge into the barrel at the same time forcing down the elevator H by sliding over the inclines $h^2$ on the latter. The breech is closed at the same time and the arm is ready for firing. By means of these arrangements a series of shots can be fired in rapid succession simply by repeatedly pressing the trigger until the magazine is exhausted. As the breech does not open until after the recoil has taken place and when the barrel is moving forward, there is no pressure of gas in the barrel when this opening takes place so that there is neither any fear of any escape liable to clog up the mechanism nor any waste of gas, thus all the propelling forces of the gases are utilized in producing the carrying and penetrating power of the projectiles. It should also be observed that the rapidity with which the empty cartridge shell is ejected in great measure prevents the latter from transmitting to the barrel the heat which in other fire arms is allowed time to penetrate into the metal of the barrel so that with the same cartridges and at the same rate of firing the heating of the breech of a rifle constructed according to this invention is considerably less than in fire arms of ordinary construction. On the other hand a portion of the force of the recoil being absorbed and stored up in the springs is subsequently transmitted to the shoulder in the form of a gradual pressure, so that the effect of the shock of the recoil is almost *nil*. This reduction of the recoil is of considerable importance in weapons constructed for use by cavalry and arranged to be fired with one hand.

It is evident that this automatic repeating arrangement may be combined with fire arms of any caliber and of any size and that the principles of its construction may be applied to pieces of artillery of small caliber known as quick firing guns. The invention may in particular be applied to sporting or shot guns by means of a few modifications in the details which are rendered necessary by the form of the cartridges.

The arrangement of the fire-arm as constructed for sporting purposes is based upon the same principles and will be readily understood by means of the following description with reference to Figs. 10, 11, 12 and 13 of the annexed drawings. In this modification the part B attached to the barrel and the movable breech block C are constructed in the same way as in the military gun or rifle hereinbefore described and act in the same manner but the extractor $e$ situated at the upper part of the movable breech block C is replaced by two hooks $n\ n$ arranged at the side (Figs. 10, 12 and 13) and the ejection is effected by means of the fresh cartridge which being elevated by the elevator H pushes up the empty shell as it is being brought into line with the barrel and throws it out of the breech. The lateral opening for the introduction of the cartridges into the magazine is dispensed with, the magazine being charged at the front end and with this object is provided with an internal tube containing a spring by which the cartridges are pushed out. This tube is screwed to the magazine and is removed in order to introduce the cartridges. As in the arrangement hereinbefore described, the cartridges slide onto the elevator but the latter is not provided with a stop for holding it out of action or rather this stop is replaced by a rocking motion (dotted lines Fig. 11) of the trigger guard. With this object the said guard is pivoted upon a pin $t$ carrying a lever arm $k$ provided at the extremity with a pin or bolt $k'$ capable of engaging with a corresponding hole $h^6$ in the elevator. The same lateral rocking movement of the trigger guard places a projection $k^2$ under the sear locking the latter and preventing the gun from going off. The cartridges in the elevator bear against a stop $r^{12}$ performing the same functions as the stop $r^2$ on the door of the lateral opening in the preceding arrangement. This projection $r^{12}$ is placed upon a pin or axis $o$ and is acted upon by a spring which tends to restore it to the vertical position after it has been depressed in closing the movable breech block. The stop $h^5$ acting upon the cartridges in the magazine in place of being attached to the elevator H forms an independent piece carried by a spring and which is depressed automatically by the elevator so as to allow one cartridge to pass onto the latter. The stop $i^5$ for the movable breech block is simply actuated by the elevator H the thumb piece or projection $i'$ being dispensed with. In this case the stop is subjected to the action of the spring $r^5$ which constantly tends to cause it to engage with the movable breech block while the elevator in ascending tends on the contrary to lower it so as to disengage the said breech block.

The action of the mechanism in this modification is the same as with the arrangement first hereinbefore described.

I claim as my invention—

1. In a fire-arm the combination of a receiver, a movable barrel, a cartridge magazine under the barrel and a spring coiled around the magazine and adapted to be tensioned by the backward movement of the barrel during the recoil, to return the barrel, with a movable breech-block, a second spring bearing at one end against the receiver and at the other end against the movable breech-block and adapted to be tensioned by the recoil of the movable breech-block to return the said breech-block, and means for temporarily retaining the breech-block after the barrel has returned, whereby the breech is opened, substantially as set forth.

2. In a fire-arm, the combination of a receiver, a movable breech-block provided with a recess, and a spring adapted to be tensioned by the recoil of the movable breech-block, with a stop carried by the receiver and adapted to enter the said recess in the breech-block, and a thumb piece to actuate the said stop, all substantially as and for the purposes set forth.

3. In a fire-arm, the combination of a receiver, a movable breech-block provided with a recess, a spring adapted to be tensioned by the recoil of the movable breech-block and a stop carried by the receiver and adapted to enter the said recess in the breech-block, with an oscillating cartridge elevator adapted to rise when the breech-block moves back, the said elevator being provided with a projection adapted to act upon the said stop to automatically disengage it from the breech-block, when the elevator is completely raised, all substantially as and for the purposes set forth.

4. In a fire-arm, the combination of a receiver, a movable breech-block and a spring adapted to be tensioned by the recoil of the movable breech-block and a stop to lock the breech-block at the end of the recoil, with an oscillating cartridge elevator adapted to rise when the breech-block moves back the said elevator being provided with a projection to act upon the said stop when the elevator is raised, a screw stop $h$ to lock the elevator out of operation and a thumb piece also adapted to actuate the said stop, all substantially as and for the purposes set forth.

5. In a fire-arm, the combination of a receiver provided with inclines $f^2$, $f^3$, a movable breech-block provided with locking levers D, with a barrel, and the part B rigidly secured to the barrel and provided with notches $x$, the said locking lever adapted to engage with the notches $x$ to lock the breech-block to the barrel, and to engage with the inclines $f^2 f^3$ to unlock the breech-block from the barrel, all substantially as and for the purposes set forth.

6. In a fire-arm, the combination of a receiver, a movable breech-block provided with a firing bolt and with locking levers D to lock the movable breech-block in its closed position and a safety catch $s$ to engage with the firing bolt, with a hand lever adapted to control the said safety catch and the said locking levers whereby the safety catch cannot release the firing bolt until the movable breech-block is completely closed and locked by the locking levers, all substantially as set forth.

7. In a firearm, the combination of a receiver provided with a movable breech-block, a trigger with an oscillating cartridge elevator adapted to rise when the breech-block is drawn back, and of being lowered by the breech-block when closing and an arm on the elevator adapted to project in the path of the trigger except when the elevator is completely lowered whereby in the automatic action the trigger cannot be pulled until the breech is closed, substantially as set forth.

8. In a fire-arm, the combination of a receiver provided with a movable breech-block, a stop to retain the movable breech-block in its open position, and a trigger, with an oscillating cartridge elevator provided with a projection to act on the said stop to disengage it from the breech-block when raised and a projection to lock the trigger until the elevator is completely lowered, all substantially as and for the purposes set forth.

In testimony whereof I have signed my name to this specification in the presence of two subscribing witnesses.

PAUL DARCHE.

Witnesses:
LÉON FRANCKEN,
ROBT. M. HOOPER.